(12) United States Patent
Johnson et al.

(10) Patent No.: US 6,696,824 B1
(45) Date of Patent: Feb. 24, 2004

(54) REDUCTION OF EXTERNAL COMPONENT COUNT IN VARIABLE VOLTAGE INTEGRATED DC/DC CONVERTER

(75) Inventors: Alan Michael Johnson, Richardson, TX (US); Thomas L. Fowler, Garland, TX (US)

(73) Assignee: Texas Instruments Incorported, Dallas, TX (US)

( * ) Notice: Subject to any disclaimer, the term of this patent is extended or adjusted under 35 U.S.C. 154(b) by 0 days.

(21) Appl. No.: 10/235,391

(22) Filed: Sep. 5, 2002

(51) Int. Cl.[7] ................................................. G05F 1/40
(52) U.S. Cl. ........................................ 323/280; 323/282
(58) Field of Search ................................ 323/280, 282, 323/283, 285, 351

(56) References Cited

U.S. PATENT DOCUMENTS

| | | | |
|---|---|---|---|
| 4,837,495 A | * | 6/1989 | Zansky ........................ 323/222 |
| 6,181,120 B1 | * | 1/2001 | Hawkes et al. ............. 323/282 |
| 6,225,794 B1 | * | 5/2001 | Criscione et al. ........... 323/283 |
| 6,240,649 B1 | * | 6/2001 | McElroy ....................... 33/286 |
| 6,246,220 B1 | * | 6/2001 | Isham et al. ................ 323/224 |
| 6,316,926 B1 | * | 11/2001 | Savo et al. .................. 323/282 |
| 6,396,725 B1 | * | 5/2002 | Jacobs et al. ............... 363/131 |
| 6,552,517 B1 | * | 4/2003 | Ribellino et al. ........... 323/282 |
| 6,583,610 B2 | * | 6/2003 | Groom et al. .............. 323/288 |

* cited by examiner

Primary Examiner—Adolf D. Berhane
(74) Attorney, Agent, or Firm—W. Daniel Swayze, Jr.; W. James Brady; Frederick J. Telecky, Jr.

(57) ABSTRACT

A variable DC/DC converter system is provided that includes a feedback voltage device and a compensation device. The compensation device and compensation components are integrated into a single integrated circuit. The feedback voltage device is integrated into the single integrated circuit. The values of a first resistor and a second resistor determine the output voltage of the DC/DC converter system. The first resistor and second resistor can be external to the integrated circuit and selectable to provide a desired output voltage. Alternatively, the first resistor can be integrated into the integrated circuit, while the second resistor is external to the integrated circuit and selectable to provide a desired output voltage.

22 Claims, 6 Drawing Sheets

REDUCTION OF EXTERNAL COMPONENT COUNT IN VARIABLE VOLTAGE INTEGRATED DC/DC CONVERTER

TECHNICAL FIELD

The present invention relates to electrical circuits and more particularly to direct current (DC) to direct current (DC) power conversion and regulation.

BACKGROUND OF INVENTION

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices, so that the battery life is extended. Therefore, the prior 5-volt industry standard has decreased to a 3.3 volt industry standard, which may soon be replaced by an even lower standard. Voltage regulators have been implemented as an efficient mechanism for providing a regulated output in power supplies. One such type of regulator is known as a switching regulator or switching power supply, which controls the flow of power to a load by controlling the on and off duty-cycle of one or more power switches coupled to the load. Many different classes of switching regulators exist today.

Due to the various industry power supply standards, a variable voltage DC/DC converter allows designers to program a desired supply voltage based on the standard being implemented. The variable voltage DC/DC converter gives the designer control of the output voltage by selecting values for certain external components, but also requires that the designer provide several compensation components to compensate for phase shifts in the output voltage that effect a desired negative feedback. For example, certain variable voltage DC/DC power supply devices require that the designer provide 6–12 external compensation components. The external compensation components are required so that the poles and zeroes associated with an amplifier device on the variable voltage DC/DC converter remain stable and do not move during normal operation. The conventional variable voltage DC/DC converter employs a single error amplifier that employs customer provided external compensation components configured to provide the required output voltage, poles and zeroes. The external compensation components require a large amount of real-estate to implement the desired DC/DC conversion.

Figure 1:
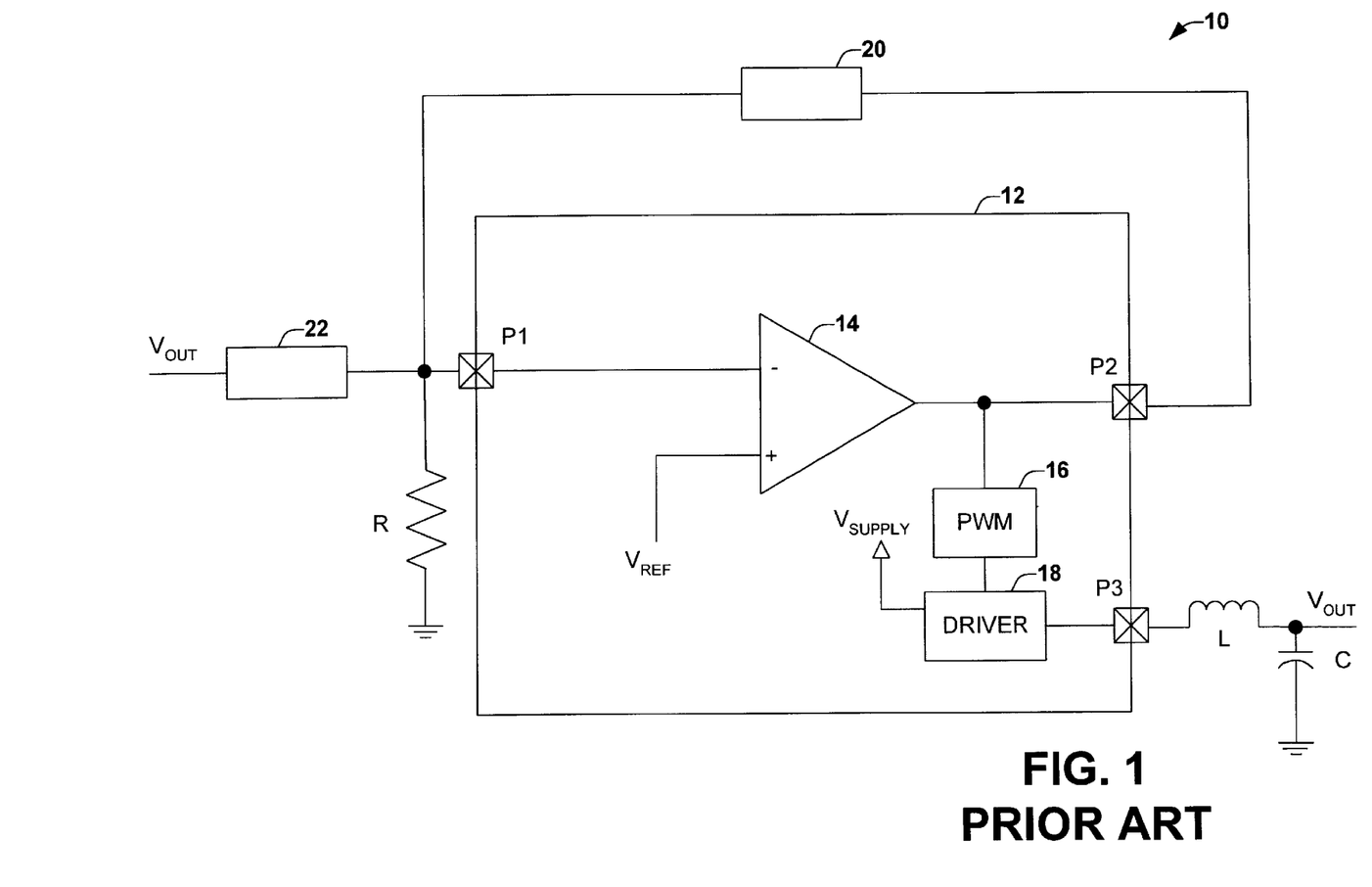
FIG. 1 illustrates a schematic block diagram of a prior art DC/DC converter.

FIG. 1 illustrates a conventional variable DC/DC converter system 10 comprised of an integrated control circuit 12 and customer supplied components that provide both the feedback voltage and the compensation for the variable DC/DC converter system 10. The integrated control circuit 12 includes an input feedback pin (P1), an output feedback pin (P2), and an output voltage pin (P3). The input feedback pin (P1) is coupled to a negative terminal of an amplifier device 14. The amplifier device 14 compares a voltage at input feedback pin (P1) with a reference voltage $V_{REF}$. The output of the amplifier device 14 is provided at the output feedback pin (P2), and as input to a pulse width modulator 16. The pulse width modulator 16 provides a switching signal to a driver 18 coupled to the output voltage pin (P3). The output of the amplifier device 14 controls the duty cycle of the switching signal provided by the pulse width modulator 16. A customer supplied coil L is coupled to the output voltage pin (P3) and a charge capacitor C.

Energy builds up in the inductor L when voltage is applied to the inductor L, which is transferred to charge the capacitor C to an output voltage $V_{OUT}$. A supply voltage $V_{SUPPLY}$ is provided at the inductor L through the driver 18 controlled by the pulse width modulator 16. The output voltage $V_{OUT}$ on the capacitor C is a function of the duty cycle of the pulse width modulator 16. The output voltage $V_{OUT}$ is fed back to the input feedback pin (P1) of the control circuit 12 through a first impedance component 22. The control circuit 12 utilizes the feedback signal to continuously adjust the duty cycle of the switching signal driving the inductor L, and as a result, providing the regulated output voltage $V_{OUT}$. The output voltage $V_{OUT}$ is a function of a voltage divider formed by the first impedance component Z1 and a resistor R, and the reference voltage $V_{REF}$.

The gain of the amplifier 14 is a function of a second impedance component 20 and the first impedance component 22. The first impedance component 22 and the second impedance component 20 are each comprised from about 3 to about 6 different components. The components of the first impedance component 22 and the second impedance component 20 control the gain, control the constants and control the output voltage of the conventional variable DC/DC converter system 10. The components of the first impedance component 22 and the second impedance component 22 include compensation components. The compensation components are provided to maintain a phase shift under 180°, caused by the inductor L and capacitor C combination (L-C filter), so that the feedback remains negative.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a variable voltage DC/DC converter system that separates the feedback voltage function and the compensation function of the DC/DC converter system into two different devices. A compensation device and compensation components can then be integrated into a single integrated circuit. A feedback voltage device is integrated into the single integrated circuit. The output voltage of the DC/DC converter is fed back to a voltage divider circuit. The voltage divider circuit includes a first resistor and a second resistor. The values of the first resistor and the second resistor determine the output voltage of the DC/DC converter system. The first and second resistors can be external to the integrated circuit and selectable by a customer. Alternatively, the first resistor is integrated into the integrated circuit, while the second resistor is external to the integrated circuit and selectable by the customer. The feedback voltage device receives the feedback signal through the voltage divider and provides the feedback signal to the compensation device. The compensation device then provides a duty cycle control signal that controls the duty cycle of a pulse width modulator. The pulse width modulator switches a supply voltage "ON" and "OFF" to an output pin. A customer supplied inductor and capacitor combination provide the desired output voltage based on the duty cycle of the pulse width modulator based on the selected resistor values.

In one aspect of the invention, the compensation function of the DC/DC converter system is comprised of an amplifier device, a first impedance component coupled to the input of the amplifier device, and a second impedance component coupled between the input and output of the amplifier device. The first and second impedance components include a plurality of compensation components that compensate for an output voltage phase shift to maintain a phase shift under 180°, so that the feedback signal remains negative. The feedback device is comprises of a wide band amplifier device that includes a third resistor coupled between an input and an output of the wide band amplifier device. The first and second resistors determine the output voltage of the system, while the first and third resistors determine the gain of the system to mitigate amplifier offset. The present invention also includes methods for fabricating a variable DC/DC converter system and a method for operating a DC/DC converter system in accordance with different aspects of the present invention.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates to a variable DC/DC converter system that includes a feedback voltage device and a compensation device. Separation of the feedback voltage function and the compensation function results in a reduction of the external component count. The compensation device and compensation components are integrated into a single integrated circuit. The feedback voltage device is integrated into the single integrated circuit. Therefore, the values of a first resistor and a second resistor determine the output voltage of the DC/DC converter system. In one aspect of the invention, the first and second resistors are external to the integrated circuit and selectable by a customer. In another aspect of the invention, the first resistor is integrated into the integrated circuit, while the second resistor is external to the integrated circuit and selectable by the customer.

Figure 2:
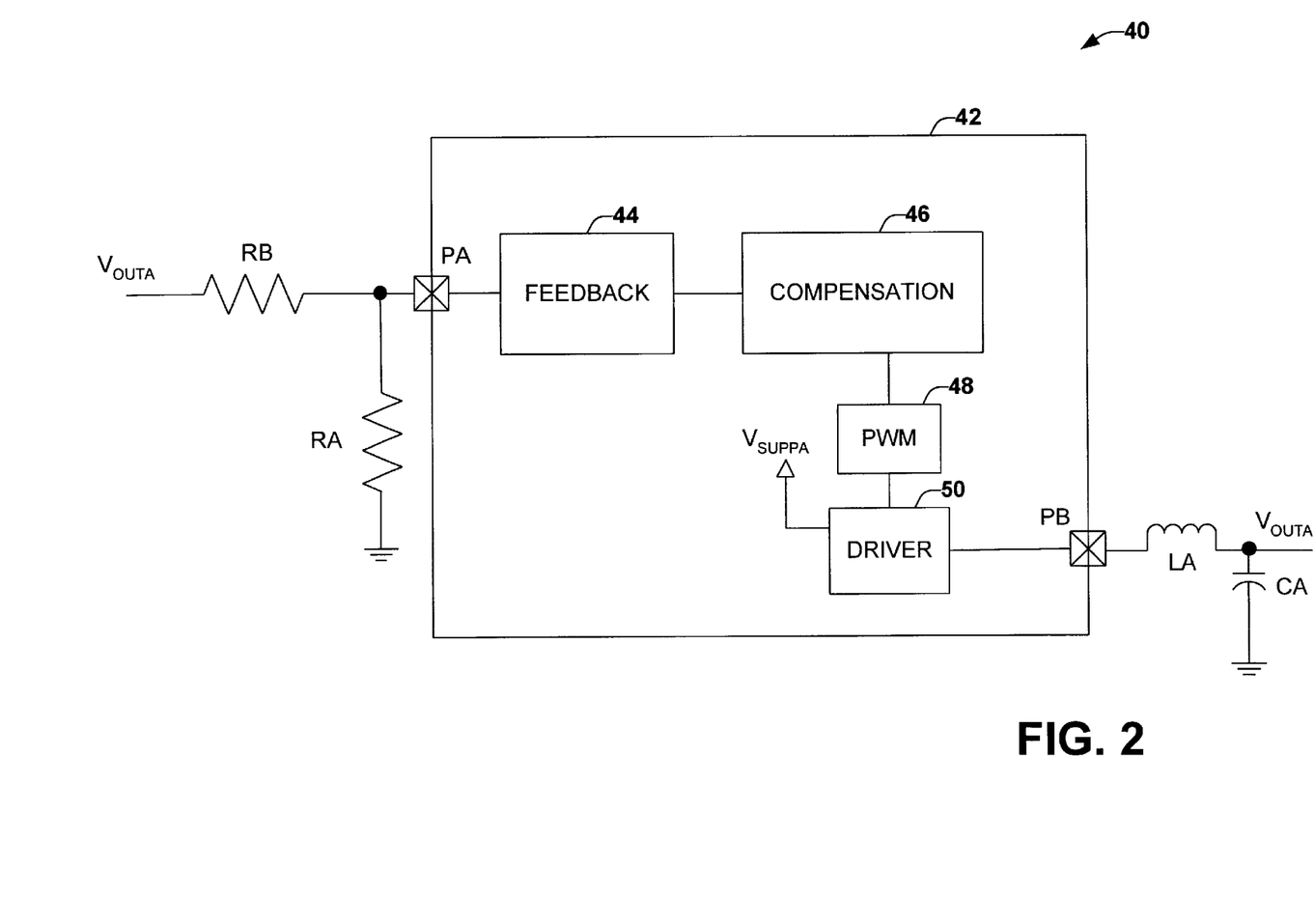
FIG. 2 illustrates a schematic block diagram of a DC/DC converter system in accordance with an aspect of the present invention.

FIG. 2 illustrates a variable DC/DC converter system 40 in accordance with an aspect of the present invention. The DC/DC converter system 40 can be, for example, a switching power supply. The variable DC/DC converter system 40 includes an integrated control circuit 42 with customer supplied components provided to select a desired output voltage. The integrated control circuit 42 includes a feedback device 44 and a compensation device 46. The feedback device 44 sets up the feedback voltage for the system 40, while the compensation device 46 provides the compensation for the system 40. The compensation device 46 facilitates maintaining a phase shift under 180°, caused by an output inductor (LA) and an output capacitor (CA) combination (L-C filter), so that the feedback remains negative. Since the compensation components are provided on the integrated control circuit 42, the customer only needs to provide two resistors RA and RB to provide the necessary feedback and to select the desired output voltage.

The integrated control circuit 42 includes an input feedback pin (PA) and an output voltage pin (PB). The input feedback pin (PA) is coupled to the feedback device 44. The feedback device 44 provides the selected output voltage based on a first customer supplied resistor RA and a second customer supplied resistor RB. The output of the feedback device 44 is coupled to the compensation device 46. The compensation device 46 provides components for compensating the system 40. Therefore, by implementing the feedback device 44 and the compensation device 46 into an integrated control circuit 42, the customer supplied components required to set the output voltage and compensate the system 40 are reduced. The output of the compensation device 46 is provided as input to a pulse width modulator 48. The pulse width modulator 48 provides a switching signal to a driver 50 coupled to the output voltage pin (PB). The output of the compensation device 46 controls the duty cycle of the switching signal provided by the pulse width modulator 48. A first end of the customer supplied inductor LA is coupled to the output voltage pin (PB) and a second side of the customer supplied inductor LA is coupled to a customer supplied output charge capacitor CA.

Energy builds up in the inductor LA when voltage is applied to the inductor LA, which is transferred to charge the capacitor CA to an output voltage $V_{OUTA}$. A supply voltage $V_{SUPPA}$ is provided at the inductor LA through the driver 50 controlled by the pulse width modulator 48. The pulse width modulator 48 switches the supply voltage $V_{SUPPA}$ "ON" and "OFF" between power and ground to provide a square wave to the output voltage pin (PB). The output voltage $V_{OUTA}$ on the capacitor CA is a function of the duty cycle of the square wave provided by the pulse width modulator 48. A feedback signal from the output voltage $V_{OUTA}$ of the capacitor CA is fed back to the input feedback pin (PA) of the control circuit 42 through the customer supplied resistor RB. The control circuit 42 utilizes the feedback signal to continuously adjust the duty cycle of the square wave control pulse driving the inductor LA, and as a result, providing a regulated output voltage $V_{OUTA}$. The feedback voltage and the output voltage $V_{OUTA}$ is a function of a voltage divider formed by the customer supplied resistor RB and the customer supplied resistor RA provided at the input pin (PA).

Figure 3:
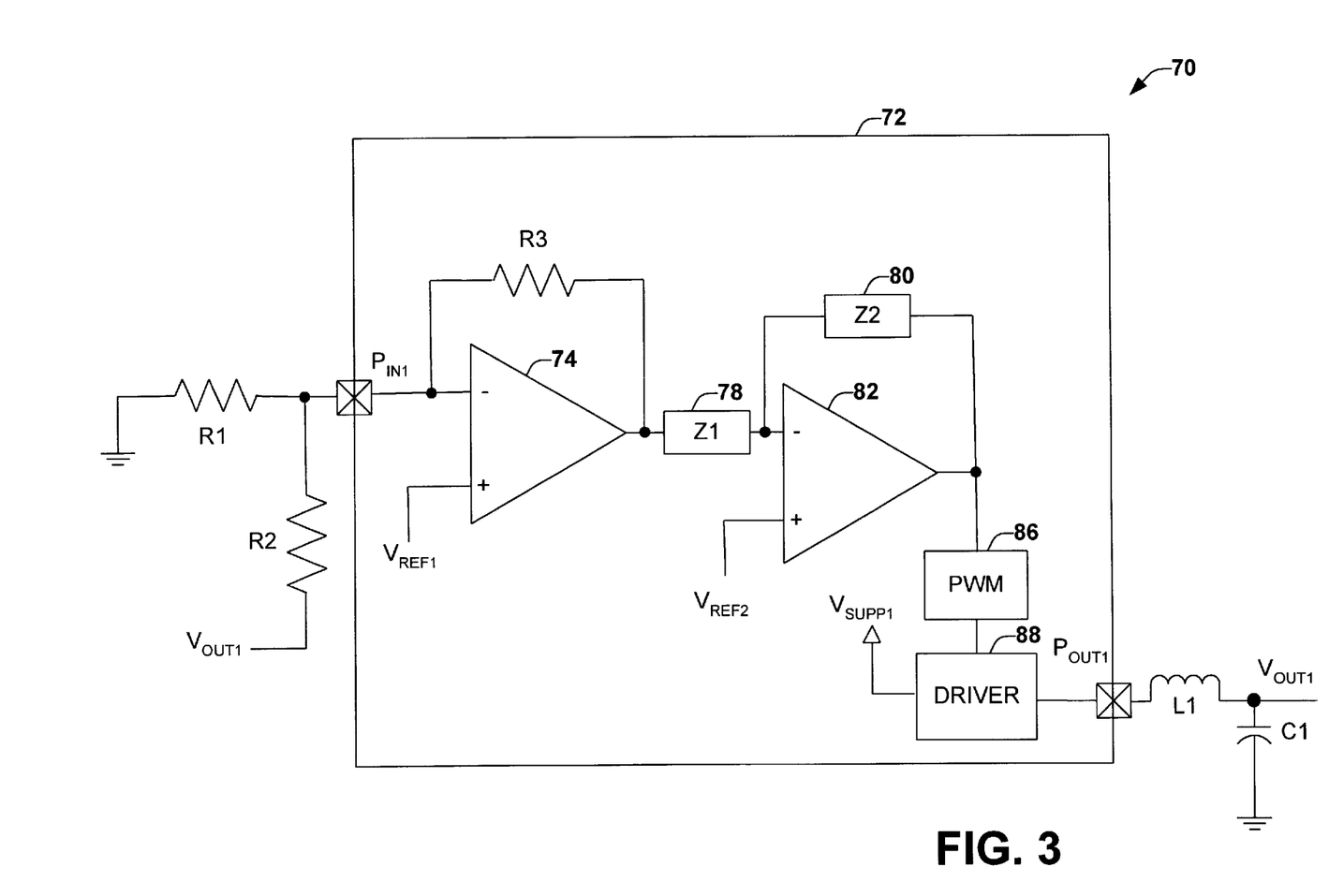
FIG. 3 illustrates a schematic block diagram of a DC/DC converter system employing two external resistors for selecting an output voltage in accordance with an aspect of the present invention.

FIG. 3 illustrates a variable DC/DC converter system 70 in accordance with another aspect of the present invention. The DC/DC converter system 70 can be, for example, a switching power supply. The variable DC/DC converter system 70 includes an integrated control circuit 72 with customer supplied components provided to select a desired output voltage. The integrated control circuit 72 includes a first amplifier 74 and a second amplifier 82. The first amplifier 74 sets up the feedback voltage for the system 70, while the second amplifier 82 provides the compensation for the system 82. Since the compensation components are provided on the integrated circuit, the customer only needs to provide a first resistor R1 and a second resistor R2 to provide the necessary feedback and to select the desired output voltage. The integrated control circuit 72 includes an input feedback pin ($P_{IN1}$) and an output voltage pin ($P_{OUT1}$). A first end of a customer supplied inductor L1 is coupled to the output voltage pin ($P_{OUT1}$) and a second side of the customer supplied inductor L1 is coupled to a customer supplied output charge capacitor C1. The customer supplied output charge capacitor C1 charges to an output voltage $V_{OUT1}$ during normal operation of the DC/DC converter system 70.

During normal operation, energy will build up in the inductor L1 when voltage is applied to the inductor L1, which is transferred to charge the capacitor C1 to an output voltage $V_{OUT1}$ when the voltage is removed. A supply voltage $V_{SUPP1}$ is provided at the inductor L1 through the driver 88 controlled by the pulse width modulator 86. The pulse width modulator 86 switches the supply voltage $V_{SUPP1}$ "ON" and "OFF" between power and ground to provide a square wave to the output voltage pin ($P_{OUT1}$). The output voltage $V_{OUT1}$ of the capacitor C1 is fed back to the integrated control circuit 72 though the second resistor R2. The control circuit 72 utilizes the feedback signal to adjust the duty cycle of the square wave control pulse driving the inductor L1, and as a result, providing the regulated output voltage $V_{OUT1}$ set by a voltage divider formed by the first resistor R1 and the second resistor R2. The first resistor R1 changes the operating point of the system 70, but not the gain of the system 70. Therefore, the voltage divider selects the output but does not affect the gain of the first amplifier 74. The input feedback pin ($P_{IN1}$) is coupled to a negative terminal of the first amplifier 74. A third resistor R3 is provided from the output of the first amplifier 74 to the input of the first amplifier 74. The second resistor R2 and the third resistor R3 set up the gain of the first amplifier 74. The gain can be selected to compensate for offset of the first amplifier 74. For example, the gain can be in the range of about 1 times to about 10 times the input voltage. A reference voltage $V_{REF1}$ is provided at the positive terminal of the first amplifier 74.

The output of the first amplifier 74 is coupled to a negative terminal of the second amplifier 82 though a first impedance component (Z1) 78. A reference voltage $V_{REF2}$ is provided at the positive terminal of the second amplifier 82. The second amplifier 82 is driven with the low impedance output of the first amplifier 74, thus, facilitating stabilization of the second amplifier 82. In one aspect of the invention, the first amplifier 74 is a wide band amplifier, which will add high frequency poles. However, the high frequency poles do not effect the operation of the second amplifier 82. The gain from the first amplifier 74 is general constant.

A second impedance component (Z2) 80 is coupled from the output of the second amplifier 82 to the negative terminal of the second amplifier 82. The first impedance component 78 and the second impedance component 80 include compensation components to compensate the system 70. The compensation components are provided to maintain a phase shift under 180°, caused by the customer supplied output inductor L1 and the customer supplied capacitor C1 combination (L-C filter), so that the feedback remains negative. The output of the second amplifier 82 is provided as input to a pulse width modulator 86. The pulse width modulator 86 provides a switching signal to a driver 88 coupled to the output voltage pin ($P_{OUT1}$). The output of the second amplifier 82 controls the duty cycle of the switching signal provided by the pulse width modulator 86.

Figure 4:
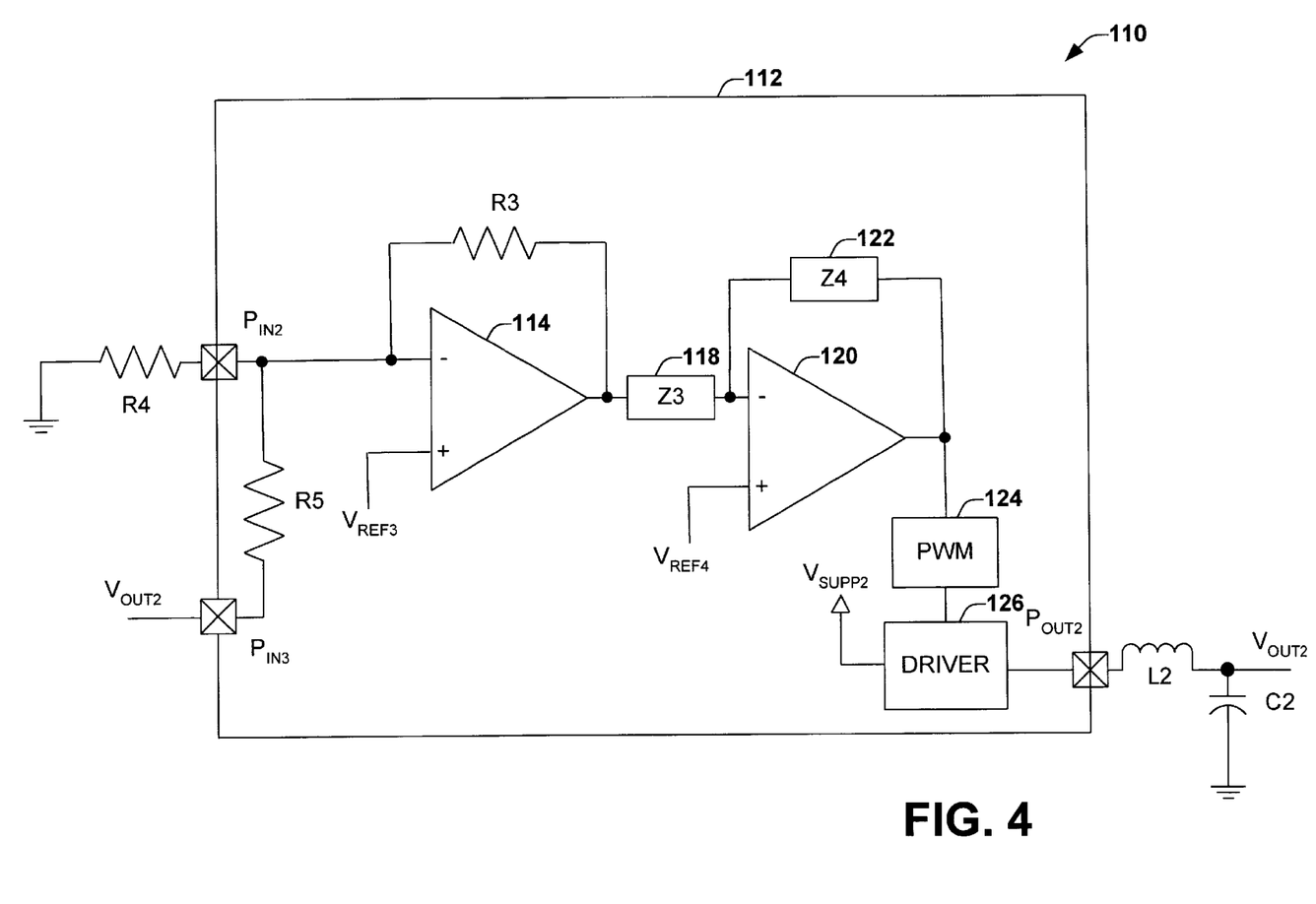
FIG. 4 illustrates a schematic block diagram of a DC/DC converter system employing a single external resistor for selecting an output voltage in accordance with an aspect of the present invention.

FIG. 4 illustrates a variable DC/DC converter system 110 having an alternate configuration in accordance with yet another aspect of the present invention. The variable DC/DC converter system 110 includes an integrated control circuit 112 with a single customer supplied resistor (R4) provided to select a desired output voltage. The integrated control circuit 112 includes a first amplifier 114 and a second amplifier 120. The first amplifier 114 sets up the feedback voltage for the system 110, while the second amplifier 120 provides the compensation for the system 110. Since the compensation components are provided on the integrated circuit, the customer only needs to provide a single resistor R4 to provide the necessary feedback and to select the desired output voltage. A second resistor R5 is provided on the integrated control circuit 112. The integrated control circuit 112 includes a first input feedback pin ($P_{IN2}$), a second input feedback pin ($P_{IN3}$) and an output voltage pin ($P_{OUT2}$). A first end of a customer supplied inductor L2 is coupled to the output voltage pin ($P_{OUT2}$) and a second side of the customer supplied inductor L2 is coupled to a customer supplied output charge capacitor C2. The customer supplied output charge capacitor C2 charges to an output voltage $V_{OUT2}$ during normal operation of the DC/DC converter system 110.

A supply voltage $V_{SUPP2}$ is provided at the inductor L2 through the driver 126 controlled by the pulse width modulator 124. The pulse width modulator 124 switches the supply voltage $V_{SUPP4}$ "ON" and "OFF" between power and ground to provide a square wave to the output voltage pin ($P_{OUT2}$), which builds up energy in the inductor L2, which is transferred to charge the capacitor C2 to the output voltage $V_{OUT2}$. The output voltage $V_{OUT2}$ of the capacitor C2 is fed back to the integrated control circuit 112 to the second input feedback pin ($P_{IN3}$). The second resistor R5 is disposed internally to the integrated control circuit 112 between the first input feedback pin ($P_{IN2}$) and the second input feedback pin ($P_{IN3}$). The integrated control circuit 112 utilizes the feedback signal to adjust the duty cycle of the control pulse driving the inductor L2, and as a result, providing a regulated output voltage $V_{OUT2}$ set by the customer supply resistor R4 and the second resistor R5 residing on the integrated control circuit 112. The first input feedback pin ($P_{IN2}$) is coupled to a negative terminal of the first amplifier 114. A third resistor R6 is provided from the output of the first amplifier 114 to the input of the first amplifier 114. The second resistor R5 and the third resistor R6 set up the gain of the first amplifier 114 to compensate for offset of the first amplifier 114. A reference voltage $V_{REF3}$ is provided at the positive terminal of the first amplifier 114.

The output of the first amplifier 114 is coupled to a negative terminal of the second amplifier 120 though a first impedance component (Z3) 118. A reference voltage $V_{REF4}$ is provided at the positive terminal of the second amplifier 120. The second amplifier 120 is driven with the low impedance output of the first amplifier 114, thus, facilitating stabilization of the second amplifier 120. The first amplifier 114 and the second amplifiers 120 can be wide band amplifiers. A second impedance component (Z4) 122 is coupled from the output of the second amplifier 120 to the negative terminal of the second amplifier 120. The first impedance component 118 and the second impedance component 122 include compensation components to compensate the system 110. The compensation components are provided to maintain a phase shift under 180°, caused by the customer supplied output inductor L2 and the customer supplied capacitor C2 combination (L-C filter), so that the feedback remains negative. The output of the second amplifier 120 is provided as input to a pulse width modulator 124. The pulse width modulator 124 provides a switching signal to a driver 126 coupled to the output voltage pin ($P_{OUTA}$). The output of the second amplifier 120 controls the duty cycle of the switching signal provided by the pulse width modulator 124.

Figure 5:
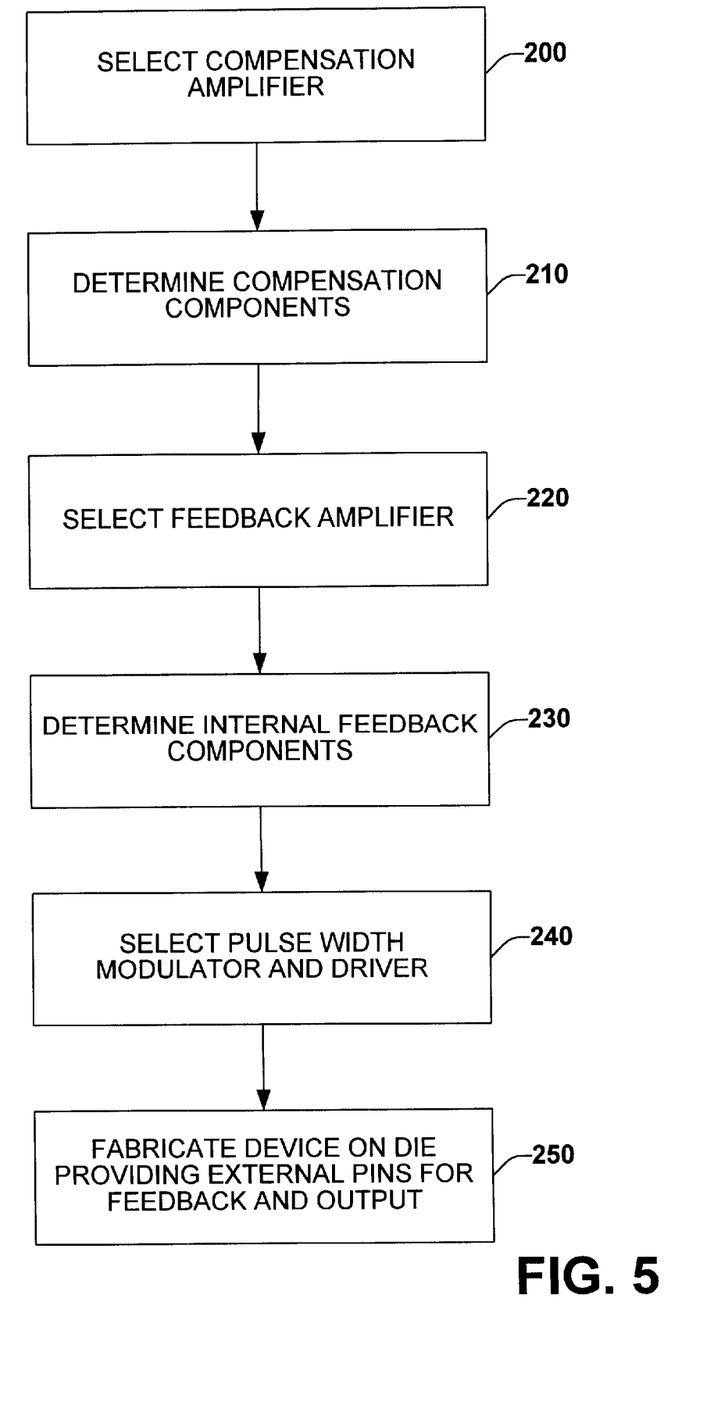
FIG. 5 illustrates a flow diagram of a methodology for providing a DC/DC converter system in accordance with an aspect of the present invention.
Figure 6:
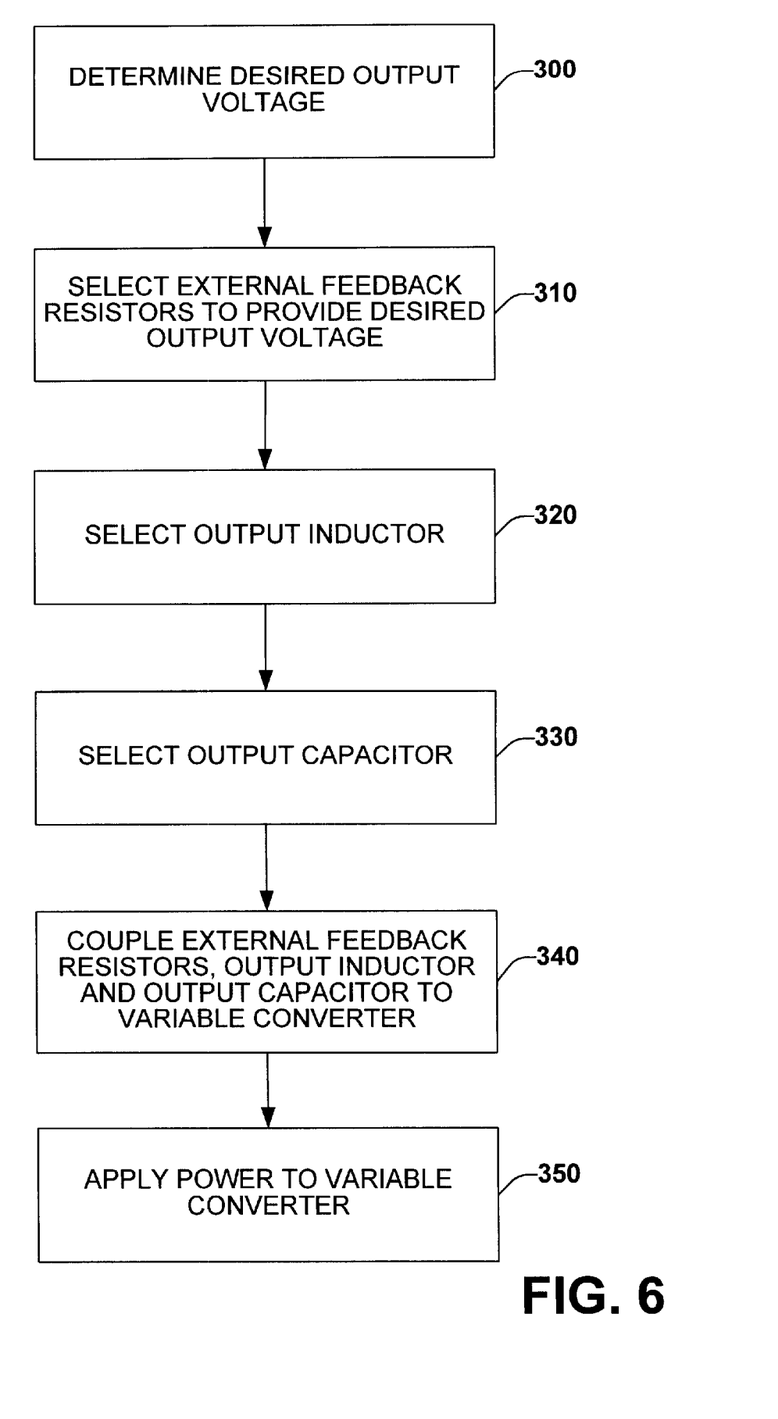
FIG. 6 illustrates a flow diagram of a methodology for selecting an output voltage of a DC/DC converter system in accordance with an aspect of the present invention.

In view of the foregoing structural and functional features described above, methodologies in accordance with various aspects of the present invention will be better appreciated with reference to FIGS. 5–6. While, for purposes of simplicity of explanation, the methodologies of FIGS. 5–6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates one particular methodology for fabricating a variable DC/DC converter. The methodology begins at 200 where a compensation amplifier is selected. The methodology then proceeds to 210. At 210, compensation components are determined to provide appropriate compensation for the system. The methodology then advances to 220. At 220, a feedback amplifier is selected. In one aspect of the invention, the feedback amplifier and the compensation amplifier are wide band amplifiers. The methodology then proceeds to 230 where internal feedback components are determined. The internal feedback components can include a first feedback resistor, or alternatively, a first feedback resistor and a second feedback resistor. If the internal feedback components includes a first feedback resistor, the voltage output can be selected by employing two external resistors to set the feedback and the output voltage. If the internal feedback components includes a first feedback resistor and a second feedback resistor, the voltage output can be selected by employing a single external resistor to set the feedback and the output voltage. A pulse width modulator and a driver are then selected at 240. The variable DC/DC converter device is then fabricated on a die with external pins for feedback and voltage output.

FIG. 6 illustrates one particular methodology for selecting and operating a variable DC/DC converter in accordance with an aspect of the invention. The methodology begins at 300 where a desired output voltage is determined based on a particular implementation. The methodology then proceeds to 310. At 310, at least one external feedback resistor is selected to provide a desired output voltage. The methodology then advances to 320. At 320, an output inductor is selected. The methodology then proceeds to 330. At 330, an output capacitor is selected. At 340, the at least one selected external feedback resistor is coupled to one or more input feedback pins. The output inductor is coupled to an output feedback pin on one end and the charge capacitor on the other end. The capacitor is grounded on one end and provides an output voltage on the end connected to the inductor. The output voltage is then fed back to one of the one or more selected resistors, or a second input feedback pin if one of the feedback resistors resides on the die. The methodology then proceeds to 350 where power is applied to the DC/DC converter.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A variable direct current to direct current (DC/DC) converter system comprising:

a feedback device operative to set up the feedback voltage of the system based on a feedback signal from an output of the system, at least one resistor coupled to a first input pin connected to the feedback device, the at least one resistor determines a desired output voltage of the system;

a compensation device coupled to the feedback device, the compensation device having at least one compensation component that compensates the system;

a pulse width modulator that provides a switching signal having a duty cycle, the duty cycle being controlled by an output of the compensation device; and a driver that switches between applying a supply voltage and a ground to an output pin based on the duty cycle of the pulse width modulator, the output pin being coupleable to an output inductor and an output capacitor to provide the desired output voltage on the output capacitor.

2. The system of claim 1, the feedback device, the compensation device, the pulse width modulator and the driver being an integrated control circuit.

3. The system of claim 1, the feedback device being a first amplifier device and the compensation device being a second amplifier device.

4. The system of claim 3, the first amplifier device having a first resistor from an output of the first amplifier to an input of the first amplifier device.

5. The system of claim 4, further comprising a second resistor coupled between the first input pin and the feedback signal, such that a single external resistor can be provided at the first input pin to select a desired output voltage, the single external resistor and the second resistor determines the output voltage of the system, the first resistor and the second resistor determines the gain of the system.

6. The system of claim 4, further comprising a second resistor coupled between the first input pin and the feedback signal and a third resistor coupled between the first input pin and ground, the second resistor and the third resistor determines the output voltage of the system, the first resistor and the second resistor determines the gain of the system.

7. The system of claim 1, the feedback device comprising an amplifier having a gain of about 1 to about 10 times the input voltage of the amplifier.

8. The system of claim 1, the compensation device comprising an amplifier device having a first impedance component coupled between the input of the amplifier device and the output of the feedback device and a second impedance component coupled between the output and the input of the amplifier device, the first and second impedance components having compensation components for compensating the system.

9. An integrated control circuit for providing a variable direct current to direct current (DC/DC) conversion, the circuit comprising:

a first amplifier operative to set up the feedback voltage of the system based on a feedback signal from an output of the system;

a second amplifier having compensation components for compensating the circuit;

a pulse width modulator that provides a switching signal having a duty cycle, the duty cycle being controlled by an output of the second amplifier based on the feedback voltage of the system; and a driver that switches between applying a supply voltage and a ground to an output pin based on the duty cycle of the pulse width modulator, the output pin being coupleable to an output inductor and an output capacitor to provide the desired output voltage on the output capacitor.

10. The circuit of claim 9, the first amplifier having a first input terminal coupled to a first input pin and a second input terminal coupled to a first reference voltage and a first resistor coupled between an output terminal and the first input terminal.

11. The circuit of claim 10, further comprising a second resistor coupled between the first input pin and a second input pin, such that a single resistor can be provided at the first input pin and the feedback signal coupled to the second input pin, the single resistor, the second resistor and the first reference voltage determines the output voltage of the system, the first resistor and the second resistor determines the gain of the system.

12. The circuit of claim 10, further comprising a second resistor coupled from the first input pin to ground and a third resistor coupled from the output pin to the first input pin, the second resistor, the third resistor and the first reference voltage determines the output voltage of the system, the first resistor and the third resistor determines the gain of the system.

13. The circuit of claim 9, the second amplifier having a first input terminal coupled to the output of the first amplifier through a first impedance component and a second input terminal coupled to a second reference voltage and a second impedance component from an output terminal to the first input terminal of the second amplifier, the first and second impedance components for compensating the circuit.

14. The circuit of claim 9, the first amplifier having a gain of about 1 to about 10 times the input voltage of the first amplifier.

15. A method for selecting an output voltage for a variable direct current to direct current (DC/DC) converter device, the method comprising:

providing a DC/DC integrated converter device having a first input pin to a feedback amplifier, a compensation amplifier coupled to the feedback amplifier, a pulse width modulator coupled to the compensation amplifier and a driver device coupled to the pulse width modulator, the driver device coupled to an output pin;

determining a desired output voltage;

selecting an external feedback resistor to provide the desired output voltage and coupling a first end of the external feedback resistor to the first input pin of the integrated DC/DC converter and ground;

selecting an output inductor and coupling a first end of the output inductor to the output pin of the integrated DC/DC converter;

selecting an output capacitor and coupling the output capacitor to a second end of the inductor and ground, the output voltage being provided at the output capacitor; and providing a feedback signal from the output voltage of the output capacitor through a second resistor to the input of the feedback amplifier.

16. The method of claim 15, the first amplifier and the second amplifier being wide band amplifiers.

17. The method of claim 15, the first amplifier having a gain of about 1 to about 10 times the input voltage of the amplifier.

18. The method of claim 15, the providing a feedback signal from the output voltage of the capacitor through a second resistor to the input of the feedback amplifier comprising selecting a second external feedback resistor and coupling the second external resistor between the first input pin and the output voltage of the capacitor.

19. The method of claim 15, the providing a feedback signal from the output voltage of the capacitor through a second resistor to the input of the feedback amplifier comprising coupling the output voltage of the capacitor to a second input pin, the second resistor being an internal resistor coupled between the first input pin and the second input pin.

20. A variable direct current to direct current (DC/DC) switching power supply integrated on an integrated circuit, the power supply comprising:

means for providing a switching signal having a duty cycle;

means for applying a supply voltage and ground to an output pin based on the duty cycle of the means for providing a switching signal, the output pin being coupleable to an inductor and capacitor combination to generate an output voltage;

means for modifying a feedback voltage to control the duty cycle of the switching signal and the output voltage of the power supply;

means for amplifying the feedback voltage to compensate for offsets of the power supply; and means for compensating the power supply to maintain a phase shift of the output under 180° due to the output capacitor and inductor combination.

21. The power supply of claim 20, the means for modifying a feedback voltage to control the duty cycle of the switching signal and the output voltage of the power supply comprising selecting a single resistor to couple between an input pin and ground, the single resistor and an internal resistor determining the output voltage.

22. The power supply of claim 20, the means for modifying a feedback voltage to control the duty cycle of the switching signal and the output voltage of the power supply comprising selecting a first resistor and a second resistor to form a voltage divider coupled to an input pin and ground, the first resistor and second resistor determining the output voltage.

* * * * *